June 20, 1967 B. LEE 3,326,069
CUT-OFF TOOL FOR LATHES
Filed Feb. 11, 1965 3 Sheets-Sheet 1

INVENTOR.
Bert Lee
BY
Webster & Webster
ATTYS.

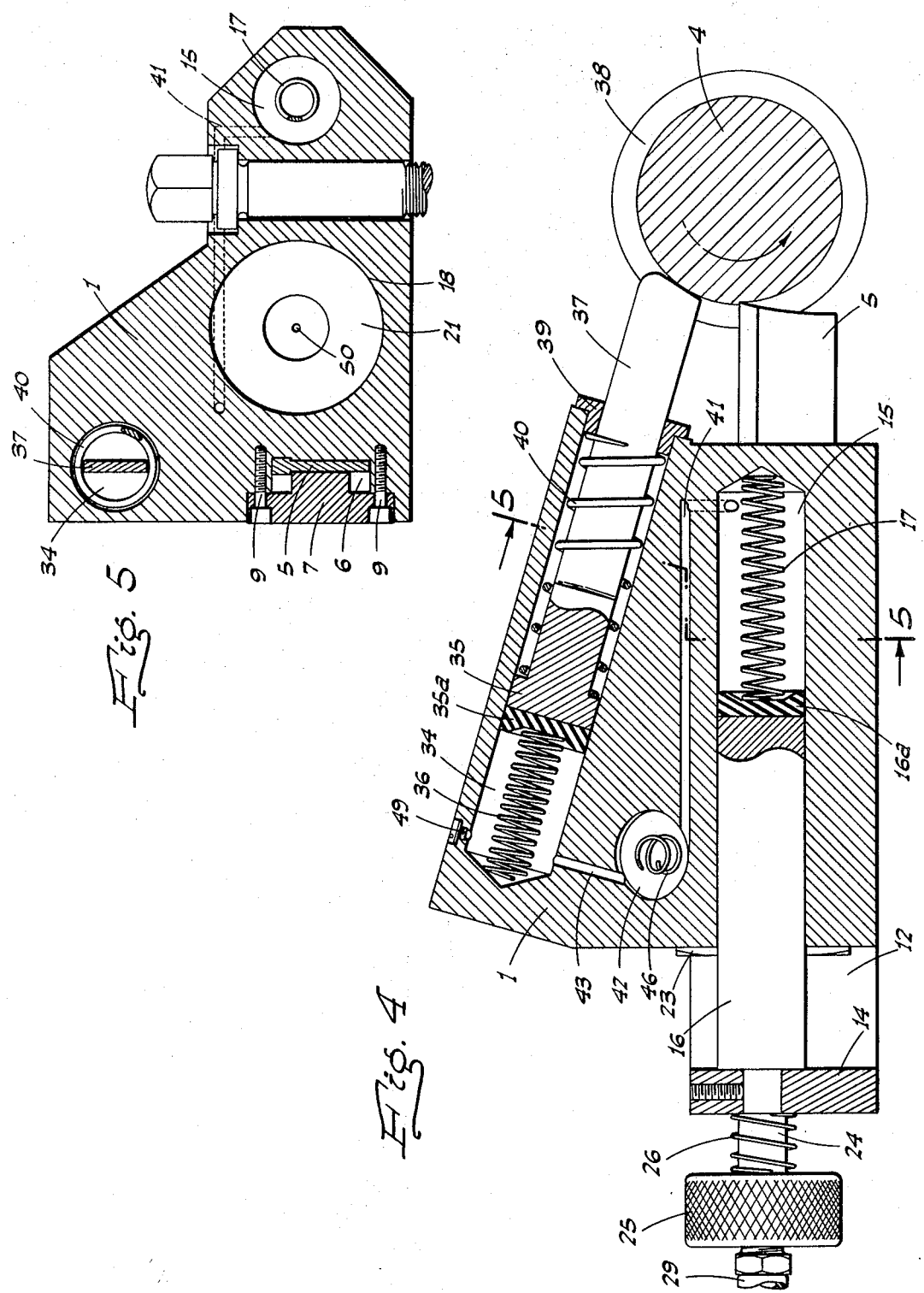

United States Patent Office 3,326,069
Patented June 20, 1967

3,326,069
CUT-OFF TOOL FOR LATHES
Bert Lee, 512 S. Hall St., Mesa, Ariz. 85201
Filed Feb. 11, 1965, Ser. No. 431,841
6 Claims. (Cl. 82—21)

This invention relates to lathe tools, and particularly to a tool for cutting off a piece of circular stock mounted in and rotated by a lathe.

The major object of the invention is to provide a tool, for the purpose described, having a cutting blade which—when once set and positioned in engagement with the work—will then automatically advance and cut into the work until the latter is severed, without any manual attention on the part of the operator being necessary while said cutting action is being effected.

A further object of the invention is to so mount and control the cutting blade that when the latter is once set to cut a certain depth in the work, such depth will be maintained while the blade is advancing into the work, and any tendency of said blade to pull itself into the work and cut faster than the blade can practicably stand, is automatically counteracted and prevented.

A further object of the invention is to provide a cut-off tool for lathes which is designed for ease and economy of manufacture, and convenience of use.

A still further object of the invention is to provide a practical, reliable, and durable cut-off tool for lathes and one which is exceedingly effective for the purpose for which is is designed.

These objects are accomplished by means of such structure and relative arrangement of parts as will fully appear by a perusal of the following specification and claims.

In the drawings:

FIG. 4 is a sectional elevation of the tool, together with a cross section of the work; the view being taken substantially on line 4—4 of FIG. 3.

FIG. 5 is a cross section of the tool taken substantially on line 5—5 of FIG. 4.

Figure 1:
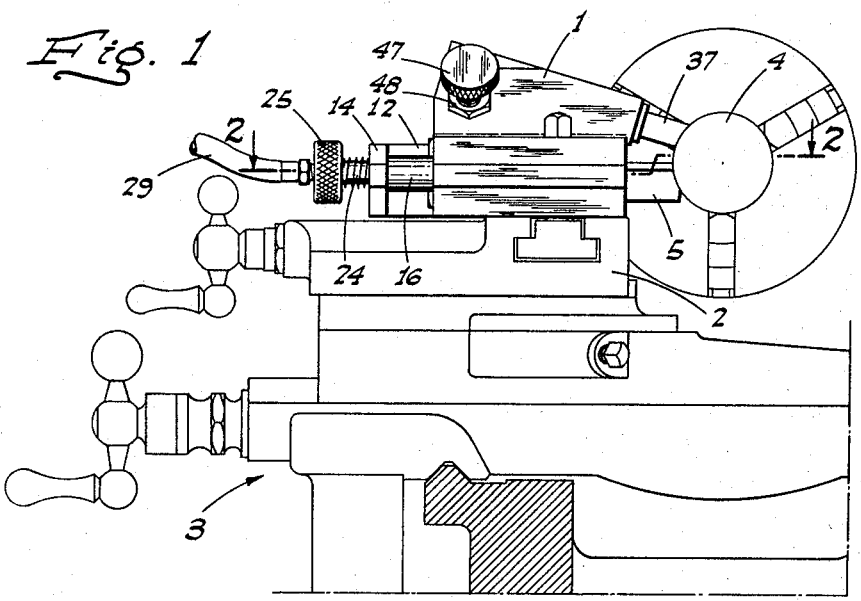
FIG. 1 is a side elevation of the improved cut-off tool, showing the same as mounted on the compound rest of a conventional machine lathe and engaged with the work.

Referring now more particularly to the drawings and to the characters of reference marked thereon, the improved cut-off tool comprises a body 1 adapted to be mounted in the usual manner on the compound rest top 2 of a conventional lathe indicated generally at 3; the body 1 thus being supported for movement both lengthwise and transversely of the lathe and relative to the piece of circular lathe-supported stock or work 4 to be cut off.

The forward end of the body 1—which end faces the work—is disposed some distance therefrom, and projecting from said end of the body and adjacent one side thereof is an elongated cut-off bit or blade 5. Such blade 5 is horizontally disposed, with its upper edge radially of the work as shown in FIG. 4, said blade extending to a point some distance rearwardly of the body 1 through a guide slot 6 in the latter. The blade, for the length of the body, is engaged by a side cap 7 which closely confines the blade while allowing sliding movement thereof relative to the body. The rear portion of the cap is cut away laterally of the blade 5 to receive a pad 8 of lubricated felt or the like; said cap being adjustably secured to the body by cap screws 9 disposed above and below the slot 6 as shown in FIG. 5.

The edges of the blade 5 at the rear portion thereof adjustably fit into top and bottom grooves 10 of a longitudinal slot 11 in an arm 12 which is slidable in the rear enlarged portion of the slot 6 and lies laterally inwardly of the rear portion of the cap 7. The blade 5 is rigidly but adjustably secured to the arm 12 by clamping screws 13 which are mounted in the grooved part of said arm and engage the adjacent portions of the blade.

Figure 2:
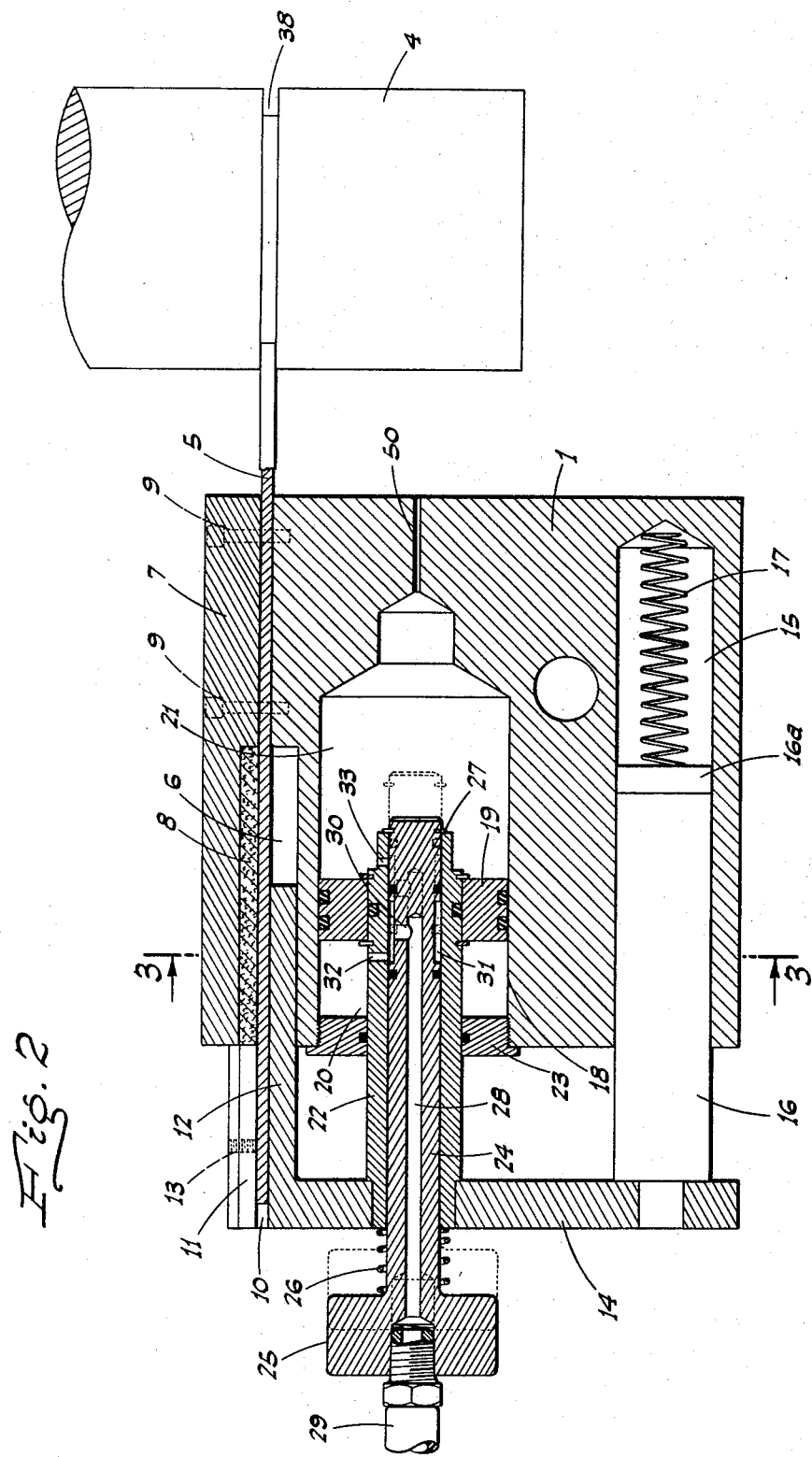
FIG. 2 is an enlarged sectional plan of the tool, showing the cut-off blade as engaged with the work; the view being taken on line 2—2 of FIG. 1.

Another arm 14 is integral with and extends at right angles to arm 12, thus being parallel to and facing the rear end of the body 1 in spaced relation thereto, as shown in FIG. 2.

Formed in the body 1 adjacent the side thereof opposite the blade 5 and parallel thereto is a hydraulic cylinder 15, which is closed at its end opposite the arm 14. A plunger 16 is slidable in the cylinder 15 and projects therefrom to a rigid connection with the arm 14. A relatively light compression spring 17 is disposed in the cylinder between the closed end thereof and a sealing gasket 16a on the adjacent end of the plunger.

Between and parallel to the cylinder 15 and the arm 12, and relatively close to the latter, the body 1 is formed with another and somewhat larger-diameter cylinder 18. A piston 19 is slidable in said other cylinder 18 intermediate the ends thereof, thus dividing the same into two separated chambers 20 and 21. The piston 19 is fixed on a tubular piston rod 22 which projects through a packing gland 23 at the rear end of the cylinder 18, and which piston rod is rigidly secured at its rear end to the arm 14.

A valve rod 24 extends through the tubular piston rod 22 from end to end thereof and in slidable relation thereto. At its rear end, which is back from the arm 14 a predetermined distance, the rod 24 is provided with a finger or hand knob 25; a compression spring 26 about the valve rod 24 between the knob and the adjacent end of the piston rod 22 tending to pull said valve rod 24 rearwardly. Movement of said valve rod 24 in a rearward direction is limited by the engagement of snap-ring 27 about the forward end of the rod 24 with the forward end of the piston rod 22, and which end is some distance ahead of the forward end of the piston 19. This is the normal position of the two rods relative to each other.

The valve rod 24 is formed with a longitudinal passage 28 which terminates short of the inner or forward end of the rod but which passage at its outer or rear end is connected to a compressed air hose 29 leading from a suitable source of air under pressure. The passage 28 adjacent its inner end connects, by means of a radial port 30, with a circumferential longitudinally extending groove 31 in the periphery of said rod 24. The groove is adapted to alternately register with ports 32 and 33 in the piston rod 22 and which communicate with chambers 20 and 21, respectively, of cylinder 18. When the valve rod 24 is in its initial rearward position, the groove 31 registers with port 32, while the port 33 is sealed off, as shown in FIG. 2. When the valve rod 24 is fully advanced, the groove 31 registers with port 33, and port 32 is then sealed off, as shown in dotted lines in FIG. 2.

Formed in the body 1 directly above the blade 5 is a second hydraulic cylinder 34, which extends forwardly and downwardly at an acute angle to said blade. Slidable in and engaging the cylinder is a piston 35 having a sealing gasket 35a at its rear end which is engaged by a relatively light compression spring 36 extending between said gasket and the rear closed end of the cylinder 34.

A control blade or finger 37, no wider than the cut-off blade 5 so that it may project into the groove 38 formed in the work 4 by said blade 5, is rigid with and projects forwardly from the piston 35 and through a guide gland 39 on the forward end of the cylinder for engagement with the work. The angle of the cylinder 34 and the position of the same relative to the work when the blade 5 first engages the same is such that the lower edge of the control finger 37 is substantially radially of the work, as shown in FIG. 4. A relatively heavy spring 40 in the cylinder 34 and about the control finger 37 between the gland 39 and the forward face of the piston 35 tends to urge the piston and finger rearwardly.

Figure 3:
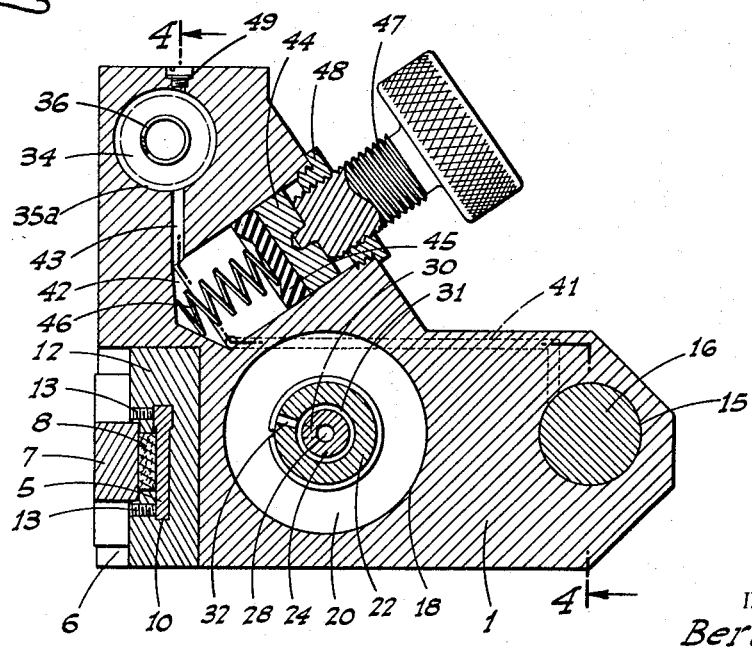
FIG. 3 is a cross section of the tool taken on line 3—3 of FIG. 2.

A fluid passageway 41 leads from the cylinder 15 adjacent its forward end to the bottom of a relatively small fluid control chamber 42 formed in the body 1 at a suitable point between the cylinders 15 and 34; another passageway 43 extending from the bottom of said chamber 42 to the rear end of the cylinder 34, as shown in FIGS. 3 and 4. A plunger 44, made pressure tight by sealing gasket 45 and both of which are retracted by a spring 46, is slidable in the chamber 42; said plunger being advanced —when required—by a manually operated screw 47 which engages the plunger and which is threaded through a nut 48 closing the outer end of the chamber 42, which otherwise opens to one face of the body 1, as shown in FIG. 3.

Fluid is initially fed into the parts of the described hydraulic system through a normally capped opening 49 leading to the rear end of the cylinder 34 from the adjacent wall of the body 1.

In operation, the body 1 is initially set with the top edge of the cut-off blade 5 in substantially the horizontal plane of the center or axis of the work 4 and as is accepted practice; such blade being, however, initially held in a retracted position. This is accomplished by keeping the knob 25 pressed in whereby to cause the compressed air in the passage 28 to feed into the chamber 21 instead of into the chamber 20 as is normally the case. The air pressure in chamber 21, pressing against the piston 19, retracts piston rod 22 and the L-shaped arm unit 14–12 rigid therewith. Since the cut-off blade 5 is also rigid with such arm unit, said blade is also retracted relative to the body. The body 1 is then moved lengthwise of the work 4 until the blade 5 clears the adjacent end of said work, which end as usual is flat. The knob 25 is then released and moves rearward with valve rod 24. This in turn causes compressed air from passage 28 to enter the chamber 20 and advance piston 19 along with the arm unit and blade 5; the air trapped in the chamber 21 gradually escaping through a bleed passage 50 leading to atmosphere from the end of said chamber 21 opposite the piston. Since the blade 5 is now unrestrained in its advancing movement as far as any contact with the work is concerned, said blade may advance toward the center or axis of the work. At the same time, the plunger 16 is advanced by reason of its connection with the arm 14. This causes the fluid to be displaced from the cylinder 15 and forced through passages 41 and 43 into the cylinder 34. The piston 35 and the projecting control finger 37 will thus also be advanced; said control finger moving in converging relation to the blade 5 until such parts reach a point of contact and which is clear of the work.

The operator then manipulates the lathe cross feed adjustments, of the compound rest on which the body 1 is mounted, until the converging point or apex of the angle, formed by the upper edge of the blade 5 and the lower edge of the finger 37, is longitudinally alined with the axis of the work 4.

The desired relative positioning of the blade 5 and finger 37 to that of the work 4 having been thus obtained, the knob 25 is again depressed to cause the blade 5 and finger 37 to be retracted, so that the body 1 may be moved along the lathe to position the blade 5 to the point at which the desired cut is to be made. The knob 25 is then released to again admit air to the chamber 20, the blade 5 and finger 37 advance, and the cutting operation starts.

The operator can easily visually determine the lead positions of the blade 5 and control finger 37 relative to each other, and consequently the depth of cut which will be made by the blade when engaged with the work and the latter is rotating. The exact desired positioning is obtained by advancing or retracting the screw 47, which increases or reduces the amount of fluid fed to the cylinder 34, as the conditions may require to obtain the desired result. It will be noted that with any such movement or adjustment of the screw 47, no fluid can back up into the cylinder 15 since the position of the plunger 16 in said cylinder is fixed by reason of its connection with the air controlled piston 19. The cutting operation continues automatically without any further manual manipulations being necessary; the air, being continually admitted to the chamber 20, urging the blade 5 forwardly into the work.

As the blade 5 thus moves forwardly or advances, the corresponding advance of the plunger 16 pushes fluid from the cylinder 15 into the cylinder 34, thus urging the finger 37 forwardly and maintaining the same in contact with the bottom of the groove 38 in the work. As the blade 5 advances, the relationship between said blade and the control finger remains constant, since the fluid from the cylinder 15 is being constantly transferred to the cylinder 34. In the event, however, that the blade 5 tends of itself to pull into the work and thus cut the metal faster than desired or the blade can practicably stand, any such tendency is counteracted by reason of the fact that the incompressible hydraulic fluid in the cylinder 15 cannot transfer to the cylinder 34 any faster than the preset relationship of the blade 5 and finger 37 will permit. The blade 5, therefore, always maintains a definite thickness of cut and advance relative to the control finger until the work is finally cut through.

From the foregoing description, it will be readily seen that there has been produced such a cut-off tool for lathes as substantially fulfills the objects of the invention, as set forth herein.

While this specification sets forth in detail the present and preferred construction of the cut-off tool for lathes, still in practice such deviations from such detail may be resorted to as do not form a departure from the spirit of the invention, as defined by the appended claims.

Having thus described the invention, the following is claimed as new and useful and upon which Letters Patent is desired:

1. In connection with a lathe having means to support a piece of circular work for rotation, a work cut-off tool comprising a body adapted to be mounted on the lathe in facing relation to the side of the work, a cutting blade disposed for engagement with the work radially thereof and at right angles thereto, a member mounted on the body for movement thereon toward and from the work and on which the blade is fixed, the member including an arm disposed at right angles to the blade and back from the body, a compressed air cylinder in the body parallel to the blade, a piston in the cylinder dividing the same into two separate chambers, a piston rod projecting from the piston and connected at its outer end to the arm, a compressed air hose, and manually operable means connected to the hose to control the admission of air alternately to the chambers.

2. A tool, as in claim 1, in which the last named means comprises a valve rod slidable in the piston rod to a termination rearwardly thereof and having a longitudinal passage to the outer end of which the hose is connected, a knob on the outer end of the valve rod for manual engagement, the piston rod having a port therethrough on each side of the piston communicating with the periphery of the valve rod and the latter having a peripheral groove communicating with the passageway and adapted to alternately register with the ports.

3. In connection with a lathe having means to support a piece of circular work for rotation, a work cut-off tool comprising a body adapted to be mounted on the lathe in facing relation to the side of the work, a cutting blade disposed for engagement with the work radially thereof and at right angles thereto, fluid pressure means movably mounting the blade on the body for advance of the blade into the work, and means to preset the blade to cut to a predetermined depth and preventing any deviation of the blade from such depth of cut; said last named means including a fluid pressure advanced work engaging finger movably mounted on the body and responsive to said fluid pressure means.

4. In connection with a lathe having means to support a piece of circular work for rotation, a work cut-off tool comprising a body adapted to be mounted on the lathe in facing relation to the side of the work, a cutting blade disposed for engagement with the work radially thereof and at right angles thereto, an L-shaped member comprising a pair of arms disposed at right angles to each other, one arm being slidably supported on the body for movement toward and from the work at right angles to the axis thereof and the blade being mounted on said one arm, the other arm extending behind and spaced from the end of the body furthest from the work, compressed air actuated means in the body and connected to the other arm to advance or retract the same relative to the body, a hydraulic cylinder in the body parallel to said one arm, a plunger slidable in said cylinder and connected at its outer end to said other arm, another hydraulic cylinder in the body opening to the end thereof nearest the work, a piston in said other cylinder, a control finger rigid with the piston and projecting from the forward end of said other cylinder and engaging the work substantially radially thereof, there being a passageway connecting the first cylinder ahead of the plunger and the other cylinder rearwardly of the piston, and fluid filling the cylinders and the passageway.

5. A tool, as in claim 4, with a chamber interposed in the passageway unit intermediate its ends, and a manually operable plunger in the chamber for advance or retraction therein to alter the fluid holding capacity thereof.

6. A tool, as in claim 5, in which the control finger is disposed in converging relation to the blade.

References Cited
UNITED STATES PATENTS

| | | | |
|---|---|---|---|
| 898,697 | 9/1908 | Spitt | 82—35 X |
| 3,130,427 | 4/1964 | McConnell | 82—24 |

FOREIGN PATENTS

| | | |
|---|---|---|
| 865,529 | 4/1961 | Great Britain. |

WILLIAM W. DYER, JR., *Primary Examiner.*

LEONIDAS VLACHOS, *Examiner.*